(12) United States Patent
Drazic et al.

(10) Patent No.: US 10,721,380 B2
(45) Date of Patent: Jul. 21, 2020

(54) PLENOPTIC CAMERA AND METHOD OF CONTROLLING THE SAME

(71) Applicant: INTERDIGITAL CE PATENT HOLDINGS, SAS, Paris (FR)

(72) Inventors: Valter Drazic, Betton (FR); Franck Galpin, Thorigne-Fouillard (FR); Mozhdeh Seifi, Thorigne-Fouillard (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/226,365

(22) Filed: Aug. 2, 2016

(65) Prior Publication Data

US 2017/0041518 A1 Feb. 9, 2017

(30) Foreign Application Priority Data

Aug. 4, 2015 (EP) .................................... 15306265

(51) Int. Cl.
| | |
|---|---|
| *H04N 5/225* | (2006.01) |
| *H04N 17/00* | (2006.01) |
| *H04N 5/357* | (2011.01) |
| *H04N 13/232* | (2018.01) |
| *G02B 3/00* | (2006.01) |
| *F21V 8/00* | (2006.01) |

(52) U.S. Cl.
CPC ......... *H04N 5/2254* (2013.01); *G02B 3/0056* (2013.01); *G02B 6/0011* (2013.01); *H04N 5/2253* (2013.01); *H04N 5/3572* (2013.01); *H04N 13/232* (2018.05); *H04N 17/002* (2013.01)

(58) Field of Classification Search
CPC .... G06T 2207/10052; H01L 27/14627; G02B 5/02–0294; G02B 7/04–105; G02B 7/28–40; G02B 3/00; H04N 5/225; H04N 17/00; H04N 5/357
USPC ............. 348/231.99, 335; 359/599, 696, 698
See application file for complete search history.

(56) References Cited

U.S. PATENT DOCUMENTS

| | | |
|---|---|---|
| 5,644,369 A | 7/1997 | Jachimowicz et al. |
| 6,377,300 B1 | 4/2002 | Morris et al. |
| 2004/0165065 A1 | 8/2004 | Smith et al. |
| | (Continued) | |

FOREIGN PATENT DOCUMENTS

CN 103095983 A 5/2013

OTHER PUBLICATIONS

Sabater et al., "Accurate Disparity Estimation for Plenoptic Images", European Conference on Computer Vision, Zurich, Switzerland, Sep. 6, 2014, pp. 548-560.

(Continued)

*Primary Examiner* — Xi Wang
(74) *Attorney, Agent, or Firm* — Invention Mine LLC (57) ABSTRACT

A plenoptic camera having a camera lens, a microlens array and a photosensors array is described. An optical device is arranged before the camera lens according to a light-traveling direction of a light flux entering the plenoptic camera. The optical device includes a first layer that is controllable between a transmissive mode and a scattering mode and at least one light source arranged at a border of the optical device. A method for controlling the plenoptic camera is also described.

15 Claims, 5 Drawing Sheets

(56) References Cited

U.S. PATENT DOCUMENTS

| | | | | |
|---|---|---|---|---|
| 2008/0239458 A1* | 10/2008 | Sachs | ............... | G02B 27/1026 |
| | | | | 359/294 |
| 2008/0303411 A1* | 12/2008 | Ohta | ................... | C09K 11/02 |
| | | | | 313/503 |
| 2010/0265381 A1* | 10/2010 | Yamamoto | ......... | G02B 27/0025 |
| | | | | 348/335 |
| 2011/0128412 A1* | 6/2011 | Milnes | .................. | G02B 27/22 |
| | | | | 348/231.99 |
| 2013/0107107 A1* | 5/2013 | Ohbuchi | ............ | H04N 5/23212 |
| | | | | 348/349 |
| 2014/0198185 A1* | 7/2014 | Haugen | ................ | G06T 7/0008 |
| | | | | 348/48 |
| 2014/0340572 A1* | 11/2014 | Sato | ........................ | G03B 7/08 |
| | | | | 348/370 |
| 2015/0350530 A1* | 12/2015 | Govindarao | ......... | H04N 5/2259 |
| | | | | 348/349 |

OTHER PUBLICATIONS

Dansereau et al., "Decoding Calibration and Rectification for Lenselet-Based Plenoptic Cameras", IEEE Conference on Computer Vision and Pattern Recognition, Portland, Oregon, USA Jun. 23, 2013, pp. 1027-1034.

* cited by examiner

PLENOPTIC CAMERA AND METHOD OF CONTROLLING THE SAME

This application claims the benefit, under 35 U.S.C. § 119 of European Patent Application No. 15306265.8, filed Aug. 4, 2015.

1. TECHNICAL DOMAIN

The present disclosure relates to the domain of plenoptic camera and more specifically to the domain of optical assembly for plenoptic camera.

2. BACKGROUND

A plenoptic camera, also called light-field camera, acquires different views of a same scene. To obtain the different views, a raw image (comprising the data collected by a photosensor array of the plenoptic camera) is demosaiced and de-multiplexed. The demosaicing enables to recover a full color raw image, i.e. to recover full color information (for example RGB information, RGB standing for "Red", "Green" and "Blue") for the pixels of the raw image while the raw image acquired with the plenoptic camera associates only one color component (R, G or B for example) with each pixel. The demultiplexing performed after the demosaicing enables to recover the different views of the scene, i.e. to group the pixels of the demosaiced raw image according to the view they belong to.

To recover the different views of the scene, it is necessary to calibrate the raw image acquired with the plenoptic camera. The main goal of this calibration is to identify center point locations of each microlens micro-image formed on the photosensor array of the plenoptic camera. Each time the main lens has undergone a change, either in zooming or in focalization, the micro-image centers have to be estimated again. This creates an inconvenience because it is not very handy to calibrate the system each time the main lens has been tweaked for a snapshot. If the system is also video capable, this means also that zooming while filming is prohibited.

3. SUMMARY

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to an optical assembly for a plenoptic camera, the optical assembly comprising a camera lens. The optical assembly further comprises an optical device arranged before the camera lens according to a light-traveling direction of a light flux entering the optical assembly, the optical device comprising a first layer that is controllable between a transmissive mode and a scattering mode and at least one light source arranged at a border of said optical device.

Advantageously, the first layer is arranged on a front face of the optical device according to the light-traveling direction of the light flux entering the optical assembly.

According to a particular characteristic, the optical device further comprises a second layer made of a transparent material, the first layer being arranged before the second layer according to the light-traveling direction of the light flux entering the optical assembly to block at least partially the light flux when in scattering mode.

Advantageously, the optical device comprises a plurality of light sources arranged to form a ring around the optical device.

According to a specific characteristic, the first layer is in the scattering mode when the at least one light source emits light.

Advantageously, the optical assembly further comprises at least one processor configured to control the optical device.

According to a specific characteristic, the at least one light source emits light when a change in focus of the camera lens is detected.

The present disclosure also relates to a method of controlling an optical assembly, the optical assembly comprising a camera lens. The method comprises controlling an optical device arranged before the camera lens according to a light-traveling direction of a light flux entering the optical assembly, the optical device comprising a first layer that is controllable between a transmissive mode and a scattering mode and at least one light source arranged at a border of the optical device.

Advantageously, the method further comprises switching the first layer in the scattering mode when the at least one light source emits light.

According to a specific characteristic, the method further comprises detecting a change in focus of the camera lens and controlling the at least a light source to emit light when a change in focus is detected.

The present disclosure also relates to a plenoptic camera comprising a microlens array, a photosensors array and the optical assembly.

The present disclosure also relates to a telecommunication device comprising the plenoptic camera.

The present disclosure also relates to a computer program product comprising instructions of program code for executing at least a step of the method of controlling the plenoptic camera, when the program is executed on a computer.

The present disclosure also relates to a non-transitory processor readable medium having stored therein instructions for causing a processor to perform at least a step of the method of controlling the plenoptic camera.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

According to a particular embodiment of the present principles, the optical assembly of a plenoptic camera comprises an optical device arranged before the camera lens according to a light-traveling direction of a light flux entering the optical assembly, the optical device comprising a first layer that is controllable between a transmissive mode and a scattering mode (also called diffusing mode) and at least one light source arranged at a border of the optical device. For sake of simplicity, drawings illustrate only one lens to illustrate the camera lens, also called main lens or primary lens. It is naturally understood that the camera lens may correspond to a set of several lenses.

The use of an optical device having different operating modes enables to acquire image(s) of a scene but also controlled image, for example a flat white raw image, that may be used to calibrate the plenoptic camera or to remove the vignetting effect.

Figure 1:
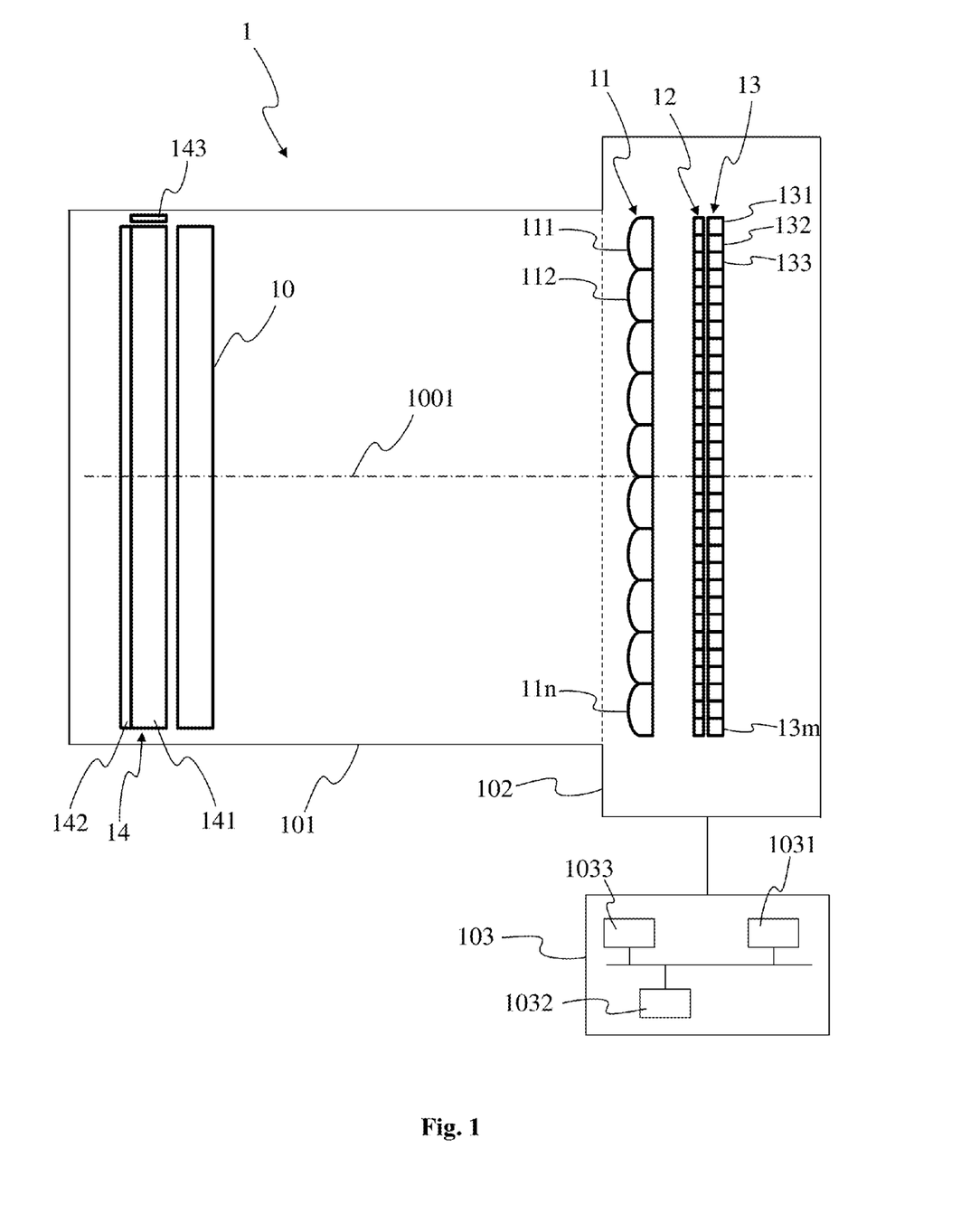
FIG. 1 shows a plenoptic camera, according to a particular embodiment of the present principles.

FIG. 1 shows a plenoptic camera 1 according to a particular embodiment of the present principles. The plenoptic camera comprises a lens unit 101 (corresponding to an optical assembly) and a camera body 102.

The lens unit 101 is advantageously adapted to be associated with the camera body 102. The camera body 102 comprises a photosensors array 13, which comprises a plurality m of photosensors 131, 132, 133 to 13m. Each photosensor corresponds to a pixel of the raw image of the scene acquired with the photosensor array, with each pixel encompassing a part (also called a point) of the scene. For purposes of illustration, the photosensor array 13 is shown with a relative small number of photosensors 131 to 13m. Naturally, the number of photosensors is not limited by the illustration of FIG. 1 but extends to any number of photosensors, for example several thousand or several millions of photosensors. For example in a 12.4 megapixel camera, a pixel will correspond to a photosensor (e.g. corresponding to an array of 4088×3040 pixels/photosensors). A color filter array (CFA) 12 may be arranged on the photosensors array 13. The CFA 12 typically arranges RGB (Red, Green and Blue) color filters on the photosensor array 13, the RGB arrangement taking for example the form of a Bayer filter mosaic. According to a variant, a CFA is arranged on the microlens array 11, also called lenslet array, (in addition to the CFA 12 or in replacement of the CFA 12).

The camera body 102 also comprises a microlens array 11 comprising n microlenses 111, 112 to 11n, n being an integer greater than or equal to 2. For purposes of illustration, the microlens array 11 is shown with a relative small number of microlenses, but the number of microlenses may extend up to several thousand or even one or several million of microlenses. A group of photosensors of the photosensor array 13 are optically associated with each microlens 111 to 11n of the microlens array 11. For example, each microlens 111 to 11n of the microlens array 11 is sized to correspond to an array of 2×1, 4×4 or 10×10 photosensors. A group of photosensors associated with a microlens (or said differently, a group of photosensors under the microlens) form a micro-image associated with this microlens, each photosensor of the group of photosensors forming a pixel of the micro-image. Each photosensor of the plurality of photosensors optically associated with one single microlens enables it to acquire raw data representative of a pixel of the scene according to one position (acquisition of as many parallaxes as pixels).

For associating the lens unit 101 with the camera body 102, the lens unit 101 comprises a first attaching part and the camera body 102 comprises a second attaching part, the first and second attaching parts being compatible with each other. Thanks to the first and second attaching parts, the lens unit 101 may be clipped onto the camera body 102 or the lens unit 101 may be screwed with the camera body 102. An example of such first and second attaching parts of a lens unit configured to be associated with a camera body may be found in the Japanese patent application JP2013-105151A, which was published on May 30, 2013. The first and second attaching parts are configured in such a way that, once the lens unit 101 and the camera body 102 have been put together, the lens unit 101 and the camera body 102 form a plenoptic camera configured for acquiring multiple views of a scene at each acquisition of the scene. According to a variant, the lens unit 101 and the camera body 102 collectively form one single body and are assembled without being detachable.

The lens unit 101 comprises a camera lens 10, also called a main lens or primary lens, which is advantageously formed of one or more lens elements, only one lens element 10 being depicted in FIG. 1 for clarity purpose. The lens unit 101 also comprises an optical device 14 arranged before or in front of the camera lens 10. "Before" or "in front of" the camera lens 10 is understood when considering the light-traveling direction of the light flux entering the plenoptic camera 1. The light coming from the scene to be acquired with the plenoptic camera and entering the plenoptic camera first crosses through the optical device 14 before crossing through the camera lens 10, the microlens array 11 and then hitting the photosensors array 13.

The optical device 14 comprises a light guide 141, a light source 143 lighting the light guide 141 and a first layer 142 arranged or coated on the front face of the light guide 141, the front face of the light guide corresponding to the face facing the scene, i.e. the face crossed first by the light flux entering the plenoptic camera 1, by contrast to the other face of the light guide 141 facing the camera lens 10.

The form of the light guide 141 is advantageously the same as the general form of the camera lens 10, for example circular. The size of the light guide 141 is for example the same as the size of the camera lens, for example the diameter of the light guide is the same as the diameter of the camera lens when the form of the camera lens 10 is, for example, circular. The size of the light guide 141 is such that the surface of the light guide is big enough to cover the camera lens such that the light flux entering the camera lens first passes through the light guide 141. According to a variant, the size of the light guide 141 is greater than the size of the camera lens 10, for example the diameter of the light guide 141 is greater than the diameter of the camera lens 10. The light guide advantageously corresponds to a device designed to transport light from the light source 143 to the face of the light guide facing the camera lens 10 with minimal loss. Light is transmitted through the light guide by means of internal reflection. The light guide 141 for example corresponds to a second layer made of a transparent material. The light guide 141 is for example made of optical grade materials such as acrylic resin, polycarbonate, epoxies, and/or glass. Examples of a light guide may be found in "*Light Guide Techniques Using LED Lamps/Application Brief I*-003" from Avago Technologies. The width of the light guide 141 along the optical axis of the camera lens 10 is for example comprised between a fraction of one millimetre and several millimetres. A gap may be arranged between the light guide and the camera lens, the gap comprising for example air or inert gas and having a width along the optical axis of the camera lens comprised for example between one millimetre to several millimetres.

The light source 143 comprises one or more light emitting devices. According to a variant, the light source 143 corresponds to an area light source having for example the form of the periphery of the light guide 141, for example the form of a ring when the light guide has a circular form. The light source 143 is arranged at the border of the light guide in a way to light the light guide 141. When the light source 141 comprises several light emitting devices, the light emitting devices are advantageously evenly distributed at the periphery of the light guide, i.e. around the light guide in such a way that the lighting of the light guide is uniform. The light source 141 advantageously emits white light. According to a variant, the light source 141 emits a light different from white light, for example yellow light or blue light.

The first layer 142 arranged on the front face of the light guide 141 may be in two different states or modes, i.e. a transmissive state/mode and a scattering state/mode. In the transmissive mode, the first layer 142 lets the light flux arriving to it passing through it. In the scattering mode, the first layer 142 scatters (diffuses) the light flux arriving to it, a part (e.g. 40% or 50%) of the light flux being reflected back to the scene and the complementary part (e.g. 60% or 50% respectively) passes through the light guide by being scattered. Consequently, when the first layer 142 is in the transmissive mode, the rays of light originating from the scene pass through the first layer 142, the light guide 141, the camera lens 10 before reaching the photosensors array 13. When the first layer 142 is in the scattering mode, the rays of light originating from the scene are partially blocked by the first layer 142 and a part of them reach the photosensors array 13. The light flux originating from the scene thus reach the photosensor array with a lower light intensity than the light emitted by the light source 143, which is activated when the layer 142 is in the scattering mode. The first layer 142 is advantageously controllable to switch from the transmissive mode to the scattering mode and from the scattering mode to the transmissive mode. The first layer 142 corresponds for example to an active diffuser of PDLC type (Polymer Dispersed Liquid Crystal Device). A PDLC active diffuser comprises a liquid mix of polymer and liquid crystals that is placed between two layers of glass or plastic that include a thin layer of a transparent, conductive material followed by curing of the polymer. Electrodes from a power supply are attached to transparent electrodes. When no voltage is applied to the liquid mix, the liquid crystals are randomly arranged in droplets, resulting in scattering of light as it passes through the PDLC active diffuser. This results in the translucent, "milky white" appearance, resulting in a scattering of the light passing through the PDLC active diffuser. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. According to another example, the first layer 142 corresponds to a SPD (Suspended particle device). In suspended particle devices (SPDs), a thin film laminate of rod-like nano-scale particles is suspended in a liquid and placed between two pieces of glass or plastic, or attached to one first layer. When no voltage is applied, the suspended particles are randomly organized, thus blocking and absorbing light. When voltage is applied, the suspended particles align and let light pass. Varying the voltage of the film varies the orientation of the suspended particles, thereby controlling the amount of light transmitted.

Naturally, the form of the optical device 14, and the form of the light guide 141 and/or of the first layer 142, is not limited to the circular form but extends to any form, for example a square or a rectangle and each can be of a different form.

The plenoptic camera 1 advantageously comprises a hardware component 103 configured for controlling the plenoptic camera 1, for example for controlling the mode of the first layer 142 and the light source 143. The light source 143 is advantageously controlled to be switched on, i.e. to light the light guide 141, when the first layer 142 is switched to the scattering mode. The light source 143 is advantageously controlled to be switched off, i.e. to not light the light guide 141, when the first layer 142 is switched to the transmissive mode. The component 103 is further configured for detecting a change in one or more parameters of the camera lens 10, for example a change of the focal length of the camera lens and/or a change of the focussing distance occurring when focalizing or zooming. The component 103 may be comprised in the camera body 102 or in the lens unit 101. The component 103 advantageously comprises one or several processors 1031 associated with a memory, for example a Random Access Memory or RAM 1032 comprising one or more registers. The memory stores instructions of one or more processes implementing the method of controlling the plenoptic camera 1. According to a variant, the component 103 takes the form of a programmable logical circuit of type FPGA (Field-Programmable Gate Array) for example, ASIC (Application-Specific Integrated Circuit) or a DSP (Digital Signal Processor). The component 103 comprises a power source 1033 comprising for example a variable voltage source capable of applying various voltages to the first layer 142 to control it and/or to apply a voltage to switch on the light source 143. The power source is advantageously controlled by the processor 1031. The component 103 may also comprise an interface configured to receive and/or transmit data such as control parameters input by, for example, a user via a user interface to set the plenoptic camera 1, the user interface being for example displayed on a display screen (for example a LCD or an OLED display) arranged for example on the camera body 102. The component 103 can also receive and/or transmit data to and/or from sources remote from the plenoptic camera 1.

According to a variant, the component 103 is not comprised in the plenoptic camera 1 but connected to the plenoptic camera 1 via a wired connection (for example via USB (Universal Serial Bus)) or via a wireless connection (for example via Bluetooth, Wi-Fi or ZigBee). According to this variant, the component 103 comprises a transmitter to exchange data with the plenoptic camera 1. According to this variant, the power source 1033 is comprised in the plenoptic camera 1.

The plenoptic camera 1 is equally of the type 1.0, corresponding to a plenoptic camera wherein the distance between the microlens array 11 and the photosensor array 13 is equal to the microlenses focal length, or of the type 2.0 otherwise (also called focused plenoptic camera).

Figure 2:
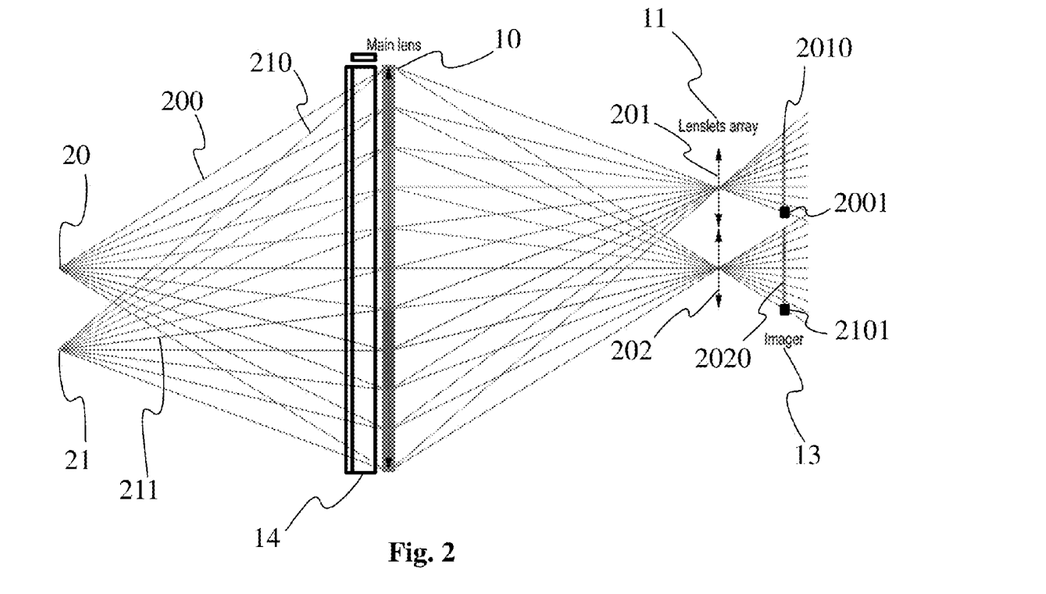
FIGS. 2 and 3 show the travel of light rays in the plenoptic camera of FIG. 1, according to particular examples of the present principles.

FIG. 2 shows light rays bundles passing through the camera lens of the plenoptic camera 1 to reach the photosensors array 13 when the first layer 142 of the optical device 14 is in the transmissive mode, according to a particular embodiment of the present principles.

As illustrated on FIG. 1, a group of photosensors of the photosensors array 13 is optically associated with each microlens of the lenslet array 11. For example, on FIG. 2, the group of photosensors 2010 is associated with the microlens 201 and the group of photosensors 2020 is associated with the microlens 202. Each group of photosensors associated with a microlens corresponds to a micro-image associated with the corresponding microlens. The number of views of a same point 20, 21 of the scene acquired with the plenoptic camera 1 corresponds to the number of photosensors optically associated with one microlens as, thanks to the geometry of the microlens, a same point of the scene is viewed according to different angles. This means that each photosensor optically associated with a given microlens acquires data representative of a specific view of a point of the scene. The number of views of the scene acquired with the plenoptic camera corresponds to the number of pixels associated with each (i.e. under each) microlens of the lenslet array 11. The number of photosensors optically associated with one microlens is advantageously the same for each microlens of the lenslet array 11. As illustrated on FIG. 2, the ray of light 200 coming from the acquired scene, from the point 20 more specifically, passes through the optical device 14, the camera lens 10, and the lenslet array 11 before reaching the photosensors array 13, i.e. the photosensor 2001 of the group 2010. In a same way, the rays of light 210, 211 coming from the acquired scene, from the point 21 more specifically, passes through the optical device 14, the camera lens 10 and the lenslet array 11 before reaching the photosensors array 13, i.e. the photosensor 2101 of the group 2020 or a photosensor of the group 2010. The optical device 14 lets the light rays coming from the scene passing through it as the first layer 142 of the optical device 14 is in the transmissive mode. Light rays 200 and 201 are called input light rays before they pass through the optical device 14 and are called output light rays once they have passed through the optical device 14.

When the first layer 142 is in the transmissive mode, the light source 143 is in the off state, meaning that no light is emitted in the light guide 141 by the light source. Only light coming from the scene reaches the photosensors array 13.

Different views of the scene are obtained by demultiplexing and demosaicing the raw image of the scene, pixels of the raw image corresponding to the photosensors of the photosensors array 13. To obtain a determined view, the pixels of this determined view are collected from the raw image. For example, pixels associated with the photosensors 2001 and 2101 belong to a same view as they are located in a same position relatively to the center of the group of photosensors they each belong to, i.e. the groups 2010 and 2020 respectively, as it will be recognized by the skilled person in the art.

Naturally, the number of photosensors of the groups of photosensors 2010, 2020 respectively associated with the microlenses 201 and 202 is not limited to the number n of photosensors illustrated on FIG. 1 each corresponding to a different view of the points 20 and 21 respectively but extends to a number greater than n. The photosensors belonging to the groups of photosensors 2010, 2020 and not illustrated on FIG. 2 advantageously receive light information received from points of the scene different from the points 20 and 21.

Figure 3:
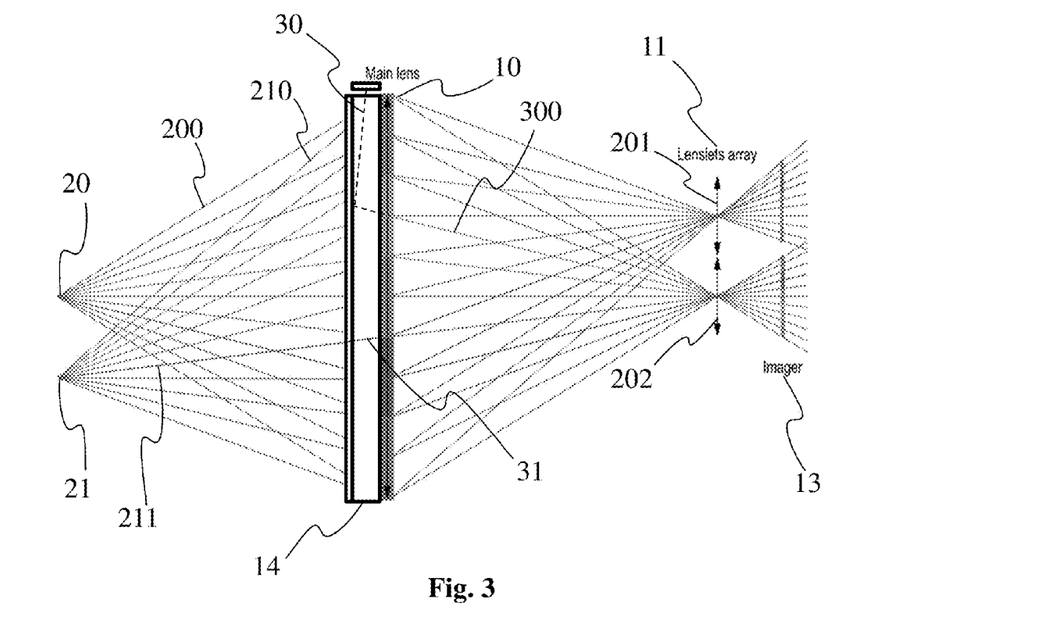

FIG. 3 shows light rays bundles coming from the scene and light rays outputting the camera lens 10 of the plenoptic camera 1 when the first layer 142 of the optical device 14 is in the scattering mode, according to a particular embodiment of the present principles.

The first layer 142 that is controlled to be in the scattering mode blocks partially the light rays 200, 210, 211 coming from the points 20, 21 of the scene. More generally, the first layer 142 in the scattering mode blocks a part of the light rays coming from the scene while scattering the complementary part of these light rays, which can pass through the first layer 142. As a consequence, only a part of the light rays coming from the scene passes through the light guide 141, the camera lens 10, and the microlens array 11. Therefore, only a percentage of the light coming from the scene reaches the photosensors array 13, the percentage depending from the voltage applied to the first layer 142. For example, the light ray 211 is scattered by the first layer 142 and forms a light ray 31 passing through the light guide 141 to reach the photosensor array, for example through the microlens 201. When the first layer is switched to the scattering mode, the light source 143 is controlled to be in the on state, i.e. to emit light toward and within the light guide 141 of the optical device 14. For purpose of clarity of illustration, only one light ray 30 originating from the light source 143 and transmitted through the light guide 141 is shown on FIG. 3. Naturally, the number of light rays emitted by the light source 143 is not limited to 1 but extends to any number. Thanks to the optical properties of the light guide 141 (difference between the index of refraction of the material composing the light guide 141 and the indices of refraction of the media surrounding the light guide, e.g. the first layer 142 or air), the light ray is guided within the light guide 141 to exit the light guide by the face facing the camera lens. The light ray 30 exits the optical device 14 forming a light ray 300, the light ray 300 entering the camera lens 10, crossing through the camera lens 10, the microlens array 11 and reaching the photosensors array 13, for example via the microlens 202. When the light emitted by the light source 143 is white light, the micro-images obtained on the photosensors array 13 are white micro-images, each white micro-image being formed under one microlens of the microlens array 11. Switching the first layer 142 to the scattering mode enables to avoid to mix light rays originating from the scene with the light rays emitted by the light source 143, which enables to obtain a flat white raw image that may be used for calibrating the plenoptic camera 1, i.e. that may be used to locate the center of each micro-image formed by each microlens on the photosensors array 13.

When the first layer 142 is in the scattering mode and controlled to let only a percentage (e.g. 30%, 40% or 50%) of the light coming from the scene passing through it by scattering (diffusion), the light reaching the photosensors array 13 corresponds to a mix of the light emitted by the light source 143 (and guided through the light guide 141) and to the percentage of the light coming from the scene and scattered by the first layer 142. If the first layer is controlled to reflect 50% of the incoming light and scatter 50% of the incoming light, the intensity of the light source is controlled such that the intensity of the light source 143 is greater than the intensity of the 50% of the light coming from the scene and scattered through the first layer 142. The image of the scene is consequently mixed with the light from the light source 143 with an intensity lower than the intensity of the light emitted by the light source 143. As the light coming from the scene is scattered, the structures of the scene do not appear on the photosensors array, due to the scattering and/or to the intensity of the light ray coming from the scene that is lower than the intensity of the light emitted by the light source 143 (the image of the scene is as drowned in the light emitted by the light source 143). A white raw image is still obtained even if a part of the light reaching the photosensors array 13 comes from the scene.

Once the flat white raw image has been acquired, the first layer 142 is switched back to the transmissive mode to enable the plenoptic camera to acquire one or more raw image comprising different views of the scene. Upon detection of a new change of the focus or zoom of the camera lens 10, the first layer 142 is controlled to be switched in scattering mode and the light source is controlled at the same time (or a few milliseconds later) to be switched on, which enables to acquire a new flat white raw image corresponding to the new focus and/or zoom parameter of the camera lens, thus enabling to determine the location of the centres of the micro-images for this new setting of the camera lens. According to an exemplary embodiment of the present principles, a flat white raw image is acquired (as described hereinabove) each time a change of the focus and/or zoom setting of the camera lens 10 is performed or detected.

Figure 4:
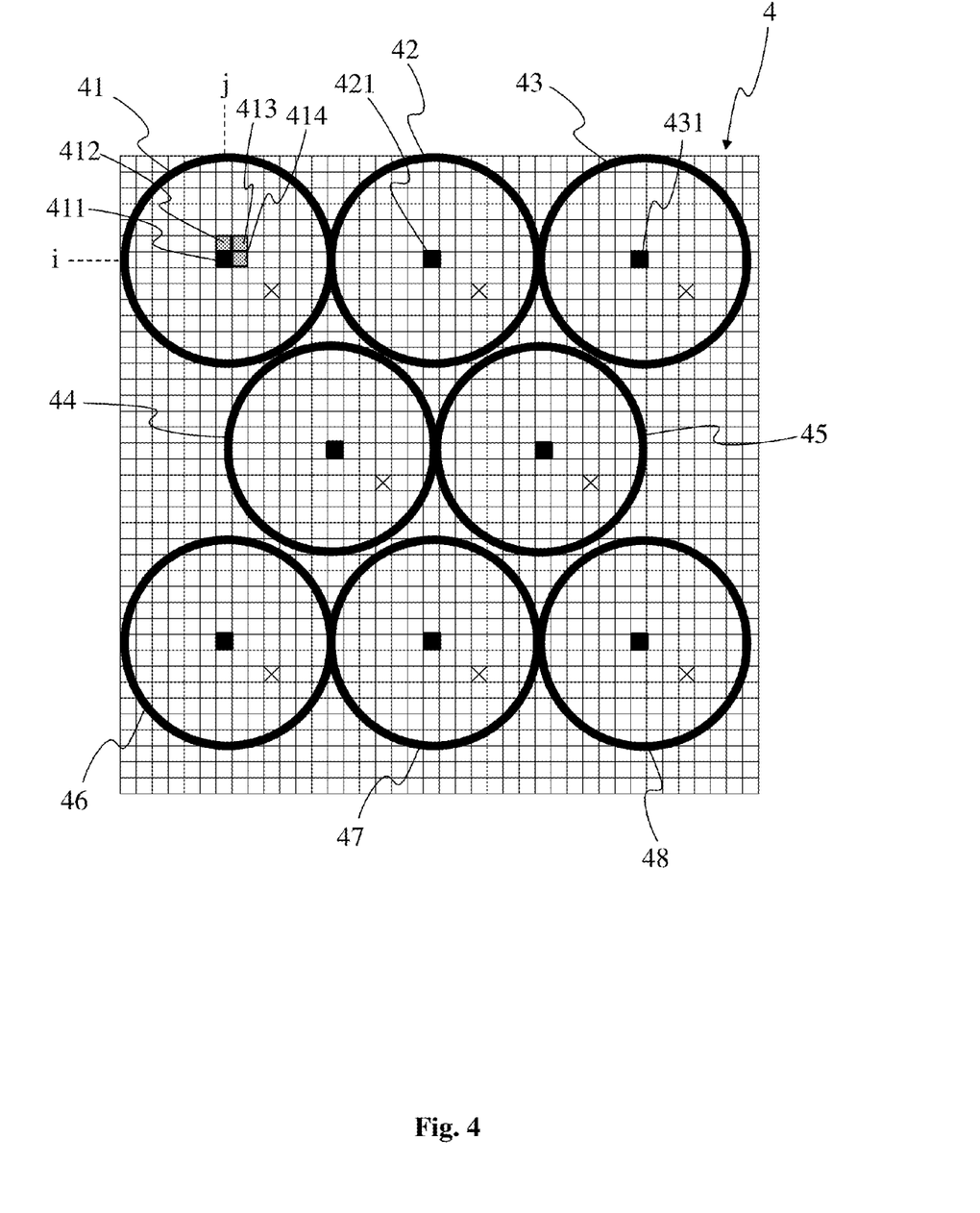
FIG. 4 shows micro-images obtained with the plenoptic camera of FIG. 1, according to a particular embodiment of the present principles.

FIG. 4 shows micro-images 41 to 48 associated with microlenses of the lenslet array 11. According to a first particular embodiment, the micro-images 41 to 48 correspond to white micro-images used for calibrating the plenoptic camera 1, i.e. to white micro-images obtained when the first layer 142 is in the scattering mode and when the light source 143 lights the light guide 141, as described with regard to FIG. 3. According to a second particular embodiment, the micro-images 41 to 48 correspond to micro-images obtained when acquiring one or more images of the scene when the first layer 142 is in the transmissive mode, as described with regard to FIG. 2. Only a part 4 of the micro-images formed on the photosensors array 13 under some microlenses of the microlens array 11 are represented on FIG. 4, i.e. micro-images 41, 42, 43, 44, 45, 46, 47 and 48.

Calibrating the plenoptic camera may be seen as determining the centre of each micro-image formed under the microlenses on the photosensors array. To achieve that aim, a flat white raw image is acquired as described with regard to FIG. 3 and white micro-images 41 to 48 are obtained. Photosensors associated with a given micro-image correspond to the photosensors, which are under the microlens under which the given micro-image is formed, i.e. the photosensors projecting onto the area covered by the given microlens. Each photosensor of the group of photosensors associated with a given micro-image corresponds to a pixel of the micro-image associated with this microlens.

To obtain the centre of each micro-image, it is determined which photosensor/pixel of a given white micro-image receives the maximum amount of light among all photosensors/pixels of this given white micro-image. The photosensors/pixels receiving the maximum amount of light are highlighted in black or light grey for each white micro-image. For example, the photosensors/pixels of the white micro-image 41 and receiving the maximum amount of light correspond to photosensors/pixels 411, 412, 413 and 414. To determine the photosensor/pixel, among the group of photosensors/pixels 411 to 414, corresponding to the centre of the white micro-image 41, the amounts of light received by each photosensor/pixel 411 to 414 are compared with each other and the photosensor/pixel having the maximum value is selected as being the reference photosensor, corresponding to the centre of the white micro-image 41. According to a variant, the reference photosensor corresponding to the centre of the white micro-image 41 is determined directly as being the photosensor receiving the maximum amount of light among the group of photosensors/pixels of the white micro-image 41. The coordinates of the centre pixel of each micro-image are for example stored, for example in a memory, in a register or in a buffer associated with the plenoptic camera.

Knowing the boundaries of each micro-image associated with each microlens and the centre pixel of each micro-image (obtained from the calibrating of the plenoptic camera 1), it is possible to collect any pixel in each micro-image to associate them with the right views. Indeed, the number of views acquired with a plenoptic camera in a single snapshot corresponds to the number of photosensors associated with one microlens, i.e. to the number of pixels/photosensors forming one micro-image. To build a given view, it is necessary to select the right pixel in each micro-image associated with the microlenses. Such a process, called demultiplexing, is performed by using the reference pixel determined as explained hereinabove, according to one embodiment of the present principles. The demultiplexing process consists in reorganizing the pixels of the raw image in such a way that all pixels capturing the light rays with a certain angle of incidence are stored in the same image creating the so-called views, also called sub-aperture views. The angular information of the light rays is given by the relative pixel positions in the micro-images with respect to the position of the reference pixel in each micro-image. Pixels under each microlens at the same relative position with regard to the centre pixel of each micro-image associated with each microlens belong to the same view. The pixels of a micro-image form a grid of pixels with R rows and C columns, for example, with R and C being integer numbers. The coordinates of the pixels of a micro-image are given with the row number and column number of the pixels. For the micro-image 41, the coordinates of the centre pixel 411 are for example (i,j). The same is true for each centre pixel of each micro-image. For example, the coordinates of the centre pixel 421 are also (i,j) in the micro-image 42 and the coordinates of the centre pixel 431 are also (i,j) in the micro-image 43, the number of pixels being the same for each micro-image as well as the numbers R and C of rows and columns in each micro-image. To build a determined view, all pixels having the same coordinates in each micro-image are selected. For example, pixels referring to a same view have been identified with a cross on FIG. 4, the coordinates of each pixel identified with a cross being (i+3,j+3) in each micro-image with regard to the coordinates (i,j) of the centre pixel of each micro-image.

Boundaries of the micro-images are for example determined from the white micro-images of the flat white raw image obtained as described with regard to FIG. 3. The micro-images have the same distribution as the distribution of the microlenses. By acquiring a flat white raw image, pixels under a microlens appear lighter than pixels not located under a microlens. Micro-images gather pixels appearing light on the photosensor array and have the same form as the form of the microlenses. According to a variant, boundaries of the micro-images may for example have been determined once for all when manufacturing the plenoptic camera, information representative of the boundaries being for example stored in a memory (for example a RAM) of the plenoptic camera. According to another variant, the boundaries of the micro-images may be determined by using the centre pixels, knowing the form of the microlenses. By taking the middle of a segment line having for extremities the centre pixels of two adjacent micro-images, the size of a micro-image may be easily determined. For example, if the microlens associated with the micro-image is circular, the radius of the micro-image corresponds to the number of pixels between the centre pixel and the pixel located at the middle of the segment line having for extremities the centre pixels of two adjacent micro-images.

Figure 5:
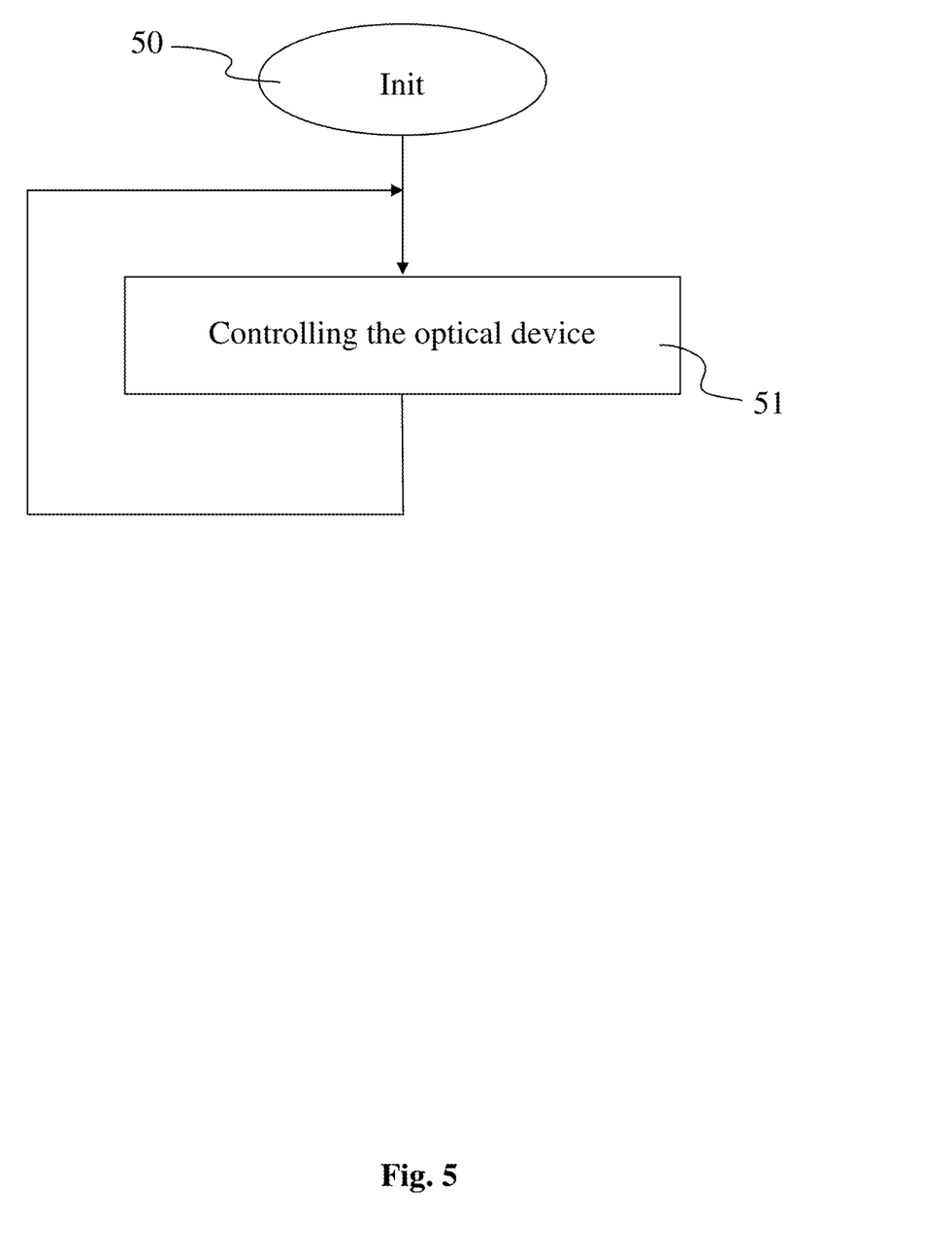
FIG. 5 shows a method of controlling the plenoptic camera of FIG. 1, according to a particular embodiment of the present principles.

FIG. 5 shows a method of controlling the plenoptic camera 1, according to a particular embodiment of the present principles.

During an initialisation step 50, the different parameters of the plenoptic camera, notably the parameters used to control the optical device 14, are updated.

Then during a step 51, the optical device 14 arranged before the camera lens 10 according to the light-traveling direction of the light flux entering the plenoptic camera is controlled, for example by the control unit 103. The optical device 14 comprises a first layer that is controllable between a transmissive mode and a scattering mode and one or more light sources arranged at the border of the optical device 14. The light source is arranged to light the optical device in a way that the light emitted by the light source exits the optical device to light the photosensors array of the plenoptic camera through the camera lens and the microlens array. The optical device is for example controlled to let light rays originating from the scene passing through it to reach the photosensors array to acquire a raw image of the scene that may be used to obtain different views of the scene. To achieve that aim, the first layer is controlled to be in the transmissive mode and the light source is controlled to be in an off state to not light the optical device. According to another example, the optical device is controlled to block a part of the light rays originating from the scene and to scatter the part of the light rays that pass through the optical device. To achieve that aim, the first layer is controlled to be in or to switch to the scattering mode. At the same time, the light source(s) is/are controlled to be in the on state to light the optical device. The first layer is switched to the scattering mode when the light source(s) emits light and/or the light source is controlled to emit light when the first layer is switched to the scattering mode. The optical device is designed to guide the light rays emitted by the light source(s) toward the photosensors array through the camera lens and the microlens array. Blocking a part of the light rays originating from the scene, scattering the complementary part of the light rays originating from the scene toward the camera lens while lighting the photosensors array with a controlled light enables to obtain a controlled raw image, for example a flat white raw image, that may be used to calibrate the plenoptic camera. The first layer is set in the scattering mode and the light source in the on state for example during one exposition period (of the photosensors array) in order to produce one flat white image when the plenoptic camera is used for still photography acquisition, or to produce one flat white frame when the plenoptic camera is used for video acquisition.

According to a variant, the first layer is controlled to be in the scattering mode while the light source is in the off state, for example to not light at all the photosensors array.

The first layer is controlled to be in the scattering mode and the light source(s) in the on state for example when switching on the plenoptic camera 1. According to an optional variant, the first layer is controlled to be in the scattering mode and the light source(s) in the on state when a change of focus and/or zoom of the camera lens is performed and/or detected. According to this variant, a flat white raw image is obtained when a change of the focus and/or zoom parameter is detected, which enables to calibrate the plenoptic camera according to this detected change. The calibration information (e.g. the coordinates of the center of each micro-image) is for example stored in a memory, in a register and/or in a buffer associated with the plenoptic camera, for example in the memory 1032 of the component 103 or in the buffer of the processor 1031 of the component 103. According to a variant, the calibration information is stored in a remote storage device, the calibration information being received by the plenoptic camera upon request.

Figure 6:
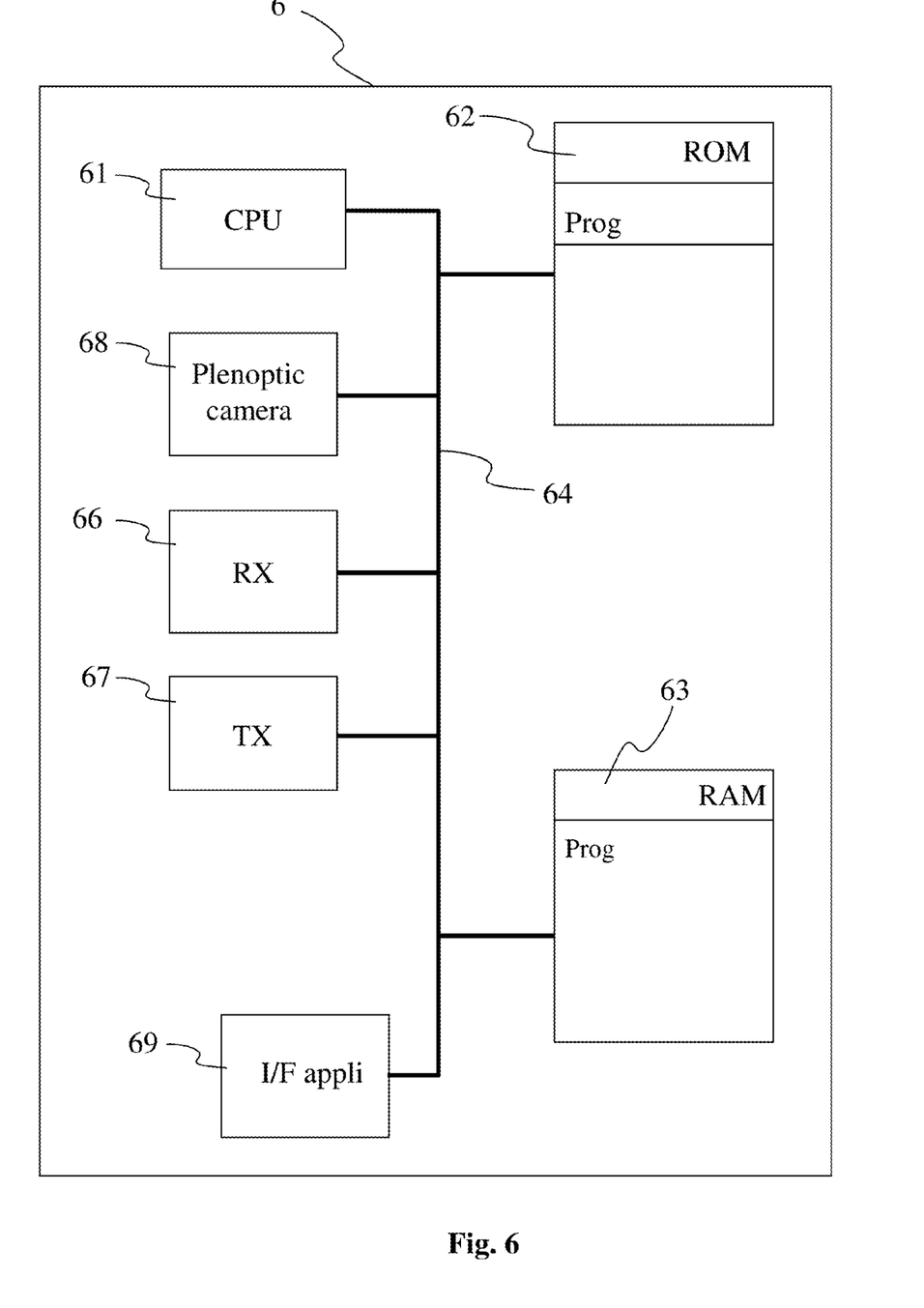
FIG. 6 shows a telecommunication device comprising the plenoptic camera of FIG. 1, according to a particular embodiment of the present principles.

FIG. 6 diagrammatically illustrates a hardware embodiment of a telecommunication device 6, corresponding for example to a smartphone or a tablet.

The telecommunication device 6 comprises the following elements, connected to each other by a bus 64 of addresses and data, that also transports a clock signal:
- a microprocessor 61 (or CPU),
- a non-volatile memory of ROM (Read Only Memory) type 62,
- a Random Access Memory or RAM 63,
- a radio interface 66,
- an interface 67 adapted for the transmission of data,
- a plenoptic camera 68, corresponding for example to the plenoptic camera 1 of FIG. 1,
- an MMI interface 69 adapted for displaying information for a user and/or inputting data or parameters.

It is noted that the word "register" used in the description of memories 62 and 63 designates in each of the memories mentioned, a memory zone of low capacity as well as a memory zone of large capacity (enabling a whole programme to be stored or all or part of the data representing data received and decoded).

The memory ROM 62 comprises in particular a "prog" program.

The algorithms implementing the steps of the method specific to the present disclosure and described below are stored in the ROM 62 memory associated with the telecommunication device 6 implementing these steps. When powered up, the microprocessor 61 loads and runs the instructions of these algorithms.

The random access memory 63 notably comprises:
- in a register, the operating programme of the microprocessor 61 responsible for switching on the telecommunication device 6,
- reception parameters (for example parameters for modulation, encoding, MIMO, recurrence of frames),
- transmission parameters (for example parameters for modulation, encoding, MIMO, recurrence of frames),
- incoming data corresponding to the data received and decoded by the receiver 66,
- decoded data formed to be transmitted at the interface to the application 69,
- parameters for controlling the optical device 14.

Other structures of the telecommunication device 6 than those described with respect to FIG. 6 are compatible with the present disclosure. In particular, according to variants, the telecommunication device may be implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

The radio interface 66 and the interface 67 are adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth) . . . .

According to a variant, the telecommunication device does not include any ROM but only RAM, the algorithms implementing the steps of the method specific to the present disclosure being stored in the RAM.

Naturally, the present disclosure is not limited to the embodiments previously described.

In particular, the present disclosure is not limited to a plenoptic optical assembly but also extends to any device integrating such a plenoptic optical assembly, for example a plenoptic camera comprising a photosensors array or a telecommunication device comprising a photosensors array.

Telecommunication devices includes, for example, smartphones, smartwatches, tablets, computers, mobile phones, portable/personal digital assistants ("PDAs"), and other devices that facilitate communication of information between end-users but also set-top-boxes.

The method and control operations of the plenoptic camera and/or of the optical device 14 described herein may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. An optical assembly for a plenoptic camera, the optical assembly comprising a camera lens and an optical device arranged before the camera lens according to a light-traveling direction of a light flux entering the optical assembly, the optical device comprising a first layer that is controllable between a transmissive mode and a scattering mode and at least one light emitting device arranged at a border of said optical device, wherein the optical device further comprises a second layer made of a transparent material, the first layer being arranged before the second layer according to the light-traveling direction of the light flux entering the optical assembly to block at least partially the light flux when in scattering mode.

2. The optical assembly according to claim 1, wherein the first layer is arranged on a front face of the optical device according to the light-traveling direction of the light flux entering the optical assembly.

3. The optical assembly according to claim 1, wherein said first layer is in the scattering mode when the at least one light emitting device emits light.

4. The optical assembly according to claim 1, further comprising at least one processor configured to control the optical device.

5. The optical assembly according to claim 1, wherein the at least one light emitting device emits light when a change in focus of the camera lens is detected.

6. A plenoptic camera comprising a microlens array, a photosensors array and a plenoptic assembly according to claim 1.

7. The optical assembly according to claim 1, wherein the at least one light emitting device comprises a plurality of light emittinci devices arranged to form a ring around the optical device.

8. A method of controlling an optical assembly for a plenoptic camera, the optical assembly comprising a camera lens, the method comprising controlling an optical device arranged before the camera lens according to a light-traveling direction of a light flux entering the optical assembly, the optical device comprising a first layer that is controllable between a transmissive mode and a scattering mode and at least one light emitting device arranged at a border of said optical device, wherein the optical device further comprises a second layer made of a transparent material, the first layer being arranged before the second layer according to the light-traveling direction of the light flux entering the optical assembly to block at least partially the light flux when in scattering mode.

9. The method according to claim 8, wherein the first layer is arranged on a front face of the optical device according to the light-traveling direction of the light flux entering the optical assembly.

10. The method according to claim 8, further comprising switching said first layer in the scattering mode when the at least one light emitting device emits light.

11. The method according to claim 8, further comprising detecting a change in focus of the camera lens and controlling the at least one light emitting device to emit light when the change in focus of the camera lens is detected.

12. The method according to claim 8, wherein the at least one light emitting device comprises a plurality of light emitting devices arranged to form a ring around the optical device.

13. A non-transitory processor readable medium having stored therein instructions for causing a processor to perform a method of controlling an optical assembly for a plenoptic camera, the optical assembly comprising a camera lens, the method comprising controlling an optical device arranged before the camera lens according to a light-traveling direction of a light flux entering the optical assembly, the optical device comprising a first layer that is controllable between a transmissive mode and a scattering mode and at least one light emitting device arranged at a border of said optical device, wherein the optical device further comprises a second layer made of a transparent material, the first layer being arranged before the second layer according to the light-traveling direction of the light flux entering the optical assembly to block at least partially the light flux when in scattering mode.

14. A non-transitory processor readable medium having stored therein instructions for causing a processor to perform a method of controlling an optical assembly for a plenoptic camera, the optical assembly comprising a camera lens, the method comprising controlling an optical device arranged before the camera lens according to a light-traveling direction of a light flux entering the optical assembly, the optical device comprising a first layer that is controllable between a transmissive mode and a scattering mode and at least one light emitting device arranged at a border of said optical device, wherein the optical device further comprises a second layer made of a transparent material, the first layer being arranged before the second layer according to the light-traveling direction of the light flux entering the optical assembly to block at least partially the light flux when in scattering mode, the method further switching said first layer in the scattering mode when the at least one light emitting device emits light.

15. A non-transitory processor readable medium having stored therein instructions for causing a processor to perform a method of controlling an optical assembly for a plenoptic camera, the optical assembly comprising a camera lens, the method comprising controlling an optical device arranged before the camera lens according to a light-traveling direction of a light flux entering the optical assembly, the optical device comprising a first layer that is controllable between a transmissive mode and a scattering mode and at least one light emitting device arranged at a border of said optical device, wherein the optical device further comprises a second layer made of a transparent material, the first layer being arranged before the second layer according to the light-traveling direction of the light flux entering the optical assembly to block at least partially the light flux when in scattering mode, the method further comprising detecting a change in focus of the camera lens and controlling the at least one light emitting device to emit light when the change in focus of the camera lens is detected.

* * * * *

UNITED STATES PATENT AND TRADEMARK OFFICE
CERTIFICATE OF CORRECTION

PATENT NO. : 10,721,380 B2
APPLICATION NO. : 15/226365
DATED : July 21, 2020
INVENTOR(S) : Valter Drazic, Franck Galpin and Mozhdeh Seifi Page 1 of 1

It is certified that error appears in the above-identified patent and that said Letters Patent is hereby corrected as shown below:

In the Claims

Column 14, Line 48, replace "emittinci" with --emitting--.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*